United States Patent
Bi et al.

(10) Patent No.: US 12,262,448 B2
(45) Date of Patent: Mar. 25, 2025

(54) INFORMATION PROCESSING METHOD, INFORMATION PROCESSING DEVICE AND COMPUTER READABLE STORAGE MEDIUM

(71) Applicant: DATANG MOBILE COMMUNICATIONS EQUIPMENT CO., LTD., Beijing (CN)

(72) Inventors: Xiaoyu Bi, Beijing (CN); Ling Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 113 days.

(21) Appl. No.: 17/766,703

(22) PCT Filed: Oct. 22, 2020

(86) PCT No.: PCT/CN2020/122745
§ 371 (c)(1),
(2) Date: Apr. 5, 2022

(87) PCT Pub. No.: WO2021/083026
PCT Pub. Date: May 6, 2021

(65) Prior Publication Data
US 2024/0073672 A1    Feb. 29, 2024

(30) Foreign Application Priority Data
Oct. 31, 2019    (CN) .......................... 201911055717.5

(51) Int. Cl.
*H04W 8/18* (2009.01)
*H04L 9/40* (2022.01)
(Continued)

(52) U.S. Cl.
CPC ........... *H04W 8/14* (2013.01); *H04L 63/0807* (2013.01); *H04L 63/1458* (2013.01); *H04W 12/06* (2013.01)

(58) Field of Classification Search
CPC ......... H04W 8/14; H04W 12/06; H04W 8/18; H04W 8/22; H04W 12/122; H04L 63/0807; H04L 63/1458
See application file for complete search history.

(56) References Cited

U.S. PATENT DOCUMENTS 10,555,165 B2 *   2/2020   Shekhar ............... H04W 12/06
10,785,652 B1 *   9/2020   Ravindranath ....... H04W 12/48
(Continued)

FOREIGN PATENT DOCUMENTS

CN    109819446 A    5/2019
CN    109873815 A    6/2019
(Continued)

OTHER PUBLICATIONS

International Search Report for PCT Application PCT/CN2020/122745, issued on Dec. 30, 2020, and its English Translation provided by WIPO.
(Continued)

*Primary Examiner* — Ahmed Elallam
(74) *Attorney, Agent, or Firm* — Ladas & Parry, LLP

(57) ABSTRACT

The present disclosure provides an information processing method, an information processing device and a computer-readable storage medium, which relate to the field of communication technology to improve the security of edge computing services. The method includes: obtaining first authentication information for a terminal; and in the case of determining that authentication of the terminal is successful according to the first authentication information, sending information of a second network element to the terminal, so
(Continued)

that the terminal obtains information of a target network element from the second network element, the information of the target network element is sent by the second network element to the terminal when edge computing authorization information of the terminal is verified, and the target network element is used to provide an edge computing service for the terminal.

20 Claims, 9 Drawing Sheets

(51) Int. Cl.
*H04W 8/14* (2009.01)
*H04W 8/22* (2009.01)
*H04W 12/06* (2021.01)
*H04W 12/122* (2021.01)

(56) References Cited

U.S. PATENT DOCUMENTS

| | | | | |
|---|---|---|---|---|
| 10,841,766 | B2* | 11/2020 | Yang | H04W 4/50 |
| 11,019,491 | B2* | 5/2021 | Lee | H04L 9/3228 |
| 11,711,678 | B2* | 7/2023 | Sabella | G06F 9/45558 |
| | | | | 370/329 |
| 11,716,246 | B2* | 8/2023 | Lee | H04L 67/04 |
| | | | | 709/222 |
| 11,716,621 | B2* | 8/2023 | Lee | H04M 15/50 |
| | | | | 455/411 |
| 12,004,111 | B2* | 6/2024 | Shan | H04W 4/40 |
| 2018/0192390 | A1 | 7/2018 | Li et al. | |
| 2019/0141536 | A1 | 5/2019 | Bachmutsky et al. | |
| 2019/0253395 | A1 | 8/2019 | Bykampadi et al. | |
| 2022/0166776 | A1* | 5/2022 | Lee | H04W 12/084 |
| 2024/0196212 | A1* | 6/2024 | Reznik | H04W 12/041 |

FOREIGN PATENT DOCUMENTS

| | | | |
|---|---|---|---|
| CN | 110139244 A | 8/2019 | |
| CN | 110267270 A | 9/2019 | |
| CN | 110278556 A | 9/2019 | |
| WO | WO-2020133655 A1 * | 7/2020 | H04L 63/0421 |

OTHER PUBLICATIONS

Written Opinion for PCT Application PCT/CN2020/122745, issued on Dec. 30, 2020, and its English Translation provided by WIPO.
International Preliminary Report on Patentability for PCT Application PCT/CN2020/122745, issued on May 3, 2022, and its English Translation provided by WIPO.
"Comments to: Incorporating Contents of the SBA Living Document Into the TR Approval," 3GPP TSGA WG3 (Security)Meeting #91, S3-181916, Comments to S3-181715, Source: Deutsche Telekom AGKPN, Agenda Item: 7.2.13.2,all pages.
"Application layer security on the N32 interface," 3GPP TSG-SA WG3 Meeting #92, S3-182672, Dalian (China), Aug. 20-24, 2018, Source to WG: Ericsson, Nokia, NTT Docomo, NCSC, KPN, Deutsche Telekom AG, China Mobile Source to TSG: S3, all pages.
First Office Action and search report for Chinese Patent Application 201911055717.5 issued on Sep. 15, 2021 by the Chinese Patent Office, and its English translation provided by Global Dossier.
"Service differentiation based on mobile subscription," 3GPP TSG-SA WG6 Meeting #31, S6-191172, S6-19115, S6-190968, Bruges, Belgium, May 20-24, 2019, Source: Samsung Electronics, Agenda Item: 70.7, all pages.

* cited by examiner

INFORMATION PROCESSING METHOD, INFORMATION PROCESSING DEVICE AND COMPUTER READABLE STORAGE MEDIUM

CROSS-REFERENCE TO RELATED APPLICATIONS

This application is the U.S. national phase of PCT Application No. PCT/CN2020/122745 filed on Oct. 22, 2020, which claims priority to the Chinese patent application No. 201911055717.5 filed on Oct. 31, 2019, the disclosures of which are incorporated herein by reference in their entireties.

TECHNICAL FIELD

The present disclosure relates to the field of communications technology, in particular to an information processing method, an information processing device and a computer readable storage medium.

BACKGROUND

Edge computing enables operators and third-party services to be hosted at access points close to User Equipment (UE), efficient service delivery is achieved by reducing end-to-end latency and load on the transport network. Edge computing can be regarded as a service provided by 3GPP network operators or third-party network providers to UEs through edge computing networks, which enables cloud computing capabilities and environments to be utilized by the edge of cellular networks. Since the edge computing network is generally deployed at the edge of the 3GPP network, the effect on other application of the UE can be minimized.

The 5G core network selects the User Plane Function (UPF) close to the UE, and performs service orientation from the UPF to the local data network through the N6 interface. This may be based on UE subscription information data, UE location, application function (AF), or other information and policies or other related business rules. The 5G core network can expose network information and functions to edge computing application functions.

In the related art, the UE accesses the edge computing network for the first time by interacting with the edge configuration server. However, authorization of UE identity and access rights is implemented between the UE and the edge enabler server. Therefore, in this case, any client can apply to the edge enabler server for edge computing service authorization. In this case, an attacker could exploit the vulnerability of this system to send a large number of requests, resulting in denial of service attack of the edge enabler server.

SUMMARY

An object of the present disclosure is to provide an information processing method, an information processing device and a computer readable storage medium, so as to improve the safety of the edge computing service.

In a first aspect, an embodiment of the present disclosure provides an information processing method, applied to a first network element, including: obtaining first authentication information for a terminal; and in the case of determining that authentication of the terminal is successful according to the first authentication information, sending information of a second network element to the terminal, so that the terminal obtains information of a target network element from the second network element, the information of the target network element is sent by the second network element to the terminal when edge computing authorization information of the terminal is verified, and the target network element is used to provide an edge computing service for the terminal.

In an embodiment of the present disclosure, the obtaining first authentication information for the terminal includes: obtaining the first authentication information from a unified data management entity (UDM); wherein, the first authentication information is obtained after the terminal is authenticated by a third network element located in a 3GPP network and stored in the UDM; or, the first authentication information is obtained after the UDM receives an authentication result of the terminal generated by the third network element located in the 3GPP network and performs verification on edge computing service capability of the terminal according to the authentication result; or, the first authentication information is obtained after the terminal is authenticated by a fourth network element and stored in the UDM, or, the first authentication information is obtained after the UDM receives an authentication result of the terminal generated by the fourth network element and performs verification on the edge computing service capability of the terminal according to the authentication result; or the first authentication information is obtained after the terminal is authenticated by an authentication network element in a DN and stored in the UDM or, the first authentication information is obtained after the UDM receives an authentication result of the terminal generated by the authentication network element in the DN and performs verification on the edge computing service capability of the terminal according to the authentication result.

In an embodiment of the present disclosure, before the obtaining first authentication information for the terminal, the method further includes: receiving a first request sent by the terminal, wherein the first request is used for requesting the edge computing service In an embodiment of the present disclosure, the obtaining first authentication information for the terminal includes: receiving a second request from the terminal; authenticating the terminal according to the second request, and obtaining the first authentication information.

In an embodiment of the present disclosure, after sending information of a second network element to the terminal, the method further includes: receiving a third request from the second network element, wherein the third request is used to verify the edge computing authorization information of the terminal; obtaining a token according to the third request; and sending the token to the second network element.

In an embodiment of the present disclosure, before the obtaining the first authentication information from UDM, the method further includes: performing mutual authentication with the UDM.

In a second aspect, an embodiment of the present disclosure provides an information processing method, applied to a second network element, including: obtaining edge computing authorization information of a terminal; in the case that the edge computing authorization information is verified, sending information of a target network element to the terminal, wherein the target network element is used to provide an edge computing service for the terminal.

In an embodiment of the present disclosure, the obtaining edge computing authorization information of a terminal includes: obtaining a token of the terminal from a UDM; or, obtaining a stored token; or, obtaining the token of the terminal from a first network element; wherein, the token indicates that the terminal has the ability to use the edge computing service.

In a third aspect, an embodiment of the present disclosure provides an information processing method, applied to a third network element, wherein the third network element is provided in a 3GPP network, the method includes: receiving a fourth request from a terminal, wherein the fourth request is used to indicate to request an edge computing service; obtaining first authentication information according to the fourth request; obtaining information of a first network element, and sending the information of the first network element to the terminal, so that the terminal interacts with the first network element, and the first network element performs authentication of the terminal according to the first authentication information.

In an embodiment of the present disclosure, the obtaining first authentication information according to the fourth request includes: authenticating the terminal according to the fourth request to obtain the first authentication information.

In an embodiment of the present disclosure, after the authenticating the terminal according to the fourth request to obtain the first authentication information, the method further includes: sending the first authentication information to a UDM, so that the UDM generates edge computing authorization information of the terminal.

In an embodiment of the present disclosure, the obtaining first authentication information according to the fourth request includes: authenticating the terminal according to the fourth request, and obtaining an authentication result; sending the authentication result to the UDM, so that the UDM verifies edge computing capability of the terminal according to the authentication result and pre-stored edge computing service capability information of the terminal, obtains the first authentication information, and generates edge computing authorization information of the terminal.

In an embodiment of the present disclosure, the obtaining the information of the first network element includes: obtaining the information of the first network element from the UDM.

In a fourth aspect, an embodiment of the present disclosure provides an information processing method, applied to a UDM, including: obtaining first authentication information and edge computing authorization information of a terminal; sending the first authentication information to a first network element; and sending the edge computing authorization information to a second network element.

In an embodiment of the present disclosure, the obtaining first authentication information and edge computing authorization information of a terminal includes: obtaining an authentication result of the terminal from a third network element or a fourth network element, and verifying edge computing capability of the terminal according to the authentication result and pre-stored edge computing service capability information of the terminal, obtaining the first authentication information, and generating the edge computing authorization information of the terminal; or obtaining the first authentication information of the terminal from the third network element or the fourth network element, and generating the edge computing authorization information of the terminal; or obtaining the first authentication information preconfigured in the UDM.

In an embodiment of the present disclosure, before the sending the authentication information to the first network element, the method further includes: performing mutual authentication with the first network element.

In an embodiment of the present disclosure, the method further incudes: pre-configuring subscription information of the terminal.

In a fifth aspect, an embodiment of the present disclosure provides an information processing method, applied to a terminal, including: obtaining information of a second network element from a first network element; obtaining information of a target network element from the second network element according to the information of the second network element; wherein, the information of the second network element is sent by the first network element when authentication of the terminal is successful; the information of the target network element is sent to the terminal when edge calculation authorization information of the terminal is verified by the second network element.

In an embodiment of the present disclosure, before the obtaining information of a second network element from a first network element, the method further includes: sending a first request to the first network element, wherein the first request is used to indicate to request an edge computing service; or sending a fourth request to a third network element request, and the fourth request is used to indicate to request the edge computing service.

In an embodiment of the present disclosure, the obtaining information of a second network element from the first network element includes: sending a second request to the first network element, so that the first network element authenticates the terminal according to the second request; receiving the information of the second network element sent by the first network element, wherein the information of the second network element is sent when the terminal passes the authentication by the first network element.

In a sixth aspect, an embodiment of the present disclosure provides an information processing device, applied to a first network element, including: a first obtaining module, configured to obtain first authentication information for a terminal; a first sending module, configured to, in the case of determining that authentication of the terminal is successful according to the first authentication information, send information of a second network element to the terminal, so that the terminal obtains information of a target network element from the second network element, the information of the target network element is sent by the second network element to the terminal when edge computing authorization information of the terminal is verified, and the target network element is used to provide an edge computing service for the terminal.

In an embodiment of the present disclosure, the first obtaining module is specifically configured to obtain the first authentication information from a UDM; wherein, the first authentication information is obtained after the terminal is authenticated by a third network element located in a 3GPP network and stored in the UDM; or, the first authentication information is obtained after the UDM receives an authentication result of the terminal generated by the third network element located in the 3GPP network and performs verification on edge computing service capability of the terminal according to the authentication result; or, the first authentication information is obtained after the terminal is authenticated by a fourth network element and stored in the UDM, or, the first authentication information is obtained after the UDM receives an authentication result of the terminal generated by the fourth network element and performs verification on the edge computing service capability of the terminal according to the authentication result; or the first authentication information is obtained after the terminal is authenticated by an authentication network element in a DN and stored in the UDM or, the first authentication information is obtained after the UDM receives an authentication result of the terminal generated by the authentication network element in the DN and performs verification on the edge computing service capability of the terminal according to the authentication result.

In a seventh aspect, an embodiment of the present disclosure provides an information processing device, applied to a second network element, including: a first obtaining module, configured to obtain edge computing authorization information of a terminal; a first sending module, configured to, in the case that the edge computing authorization information is verified, send information of a target network element to the terminal, wherein the target network element is used to provide an edge computing service for the terminal.

In an embodiment of the present disclosure, the first obtaining module is specifically configured to obtain a token of the terminal from a UDM; or, obtain a stored token; or, obtain the token of the terminal from a first network element; wherein, the token indicates that the terminal has the ability to use the edge computing service.

In an eighth aspect, an embodiment of the present disclosure provides an information processing device, applied to a third network element, wherein the third network element is provided in a 3GPP network, including: a receiving module, configured to receive a fourth request from a terminal, wherein the fourth request is used to indicate to request an edge computing service; a first obtaining module, configured to obtain first authentication information according to the fourth request; a second obtaining module, configured to obtain information of a first network element, and send the information of the first network element to the terminal, so that the terminal interacts with the first network element, and the first network element performs authentication of the terminal according to the first authentication information.

In an embodiment of the present disclosure, the first obtaining module is specifically configured to authenticate the terminal according to the fourth request to obtain the first authentication information.

In a ninth aspect, an embodiment of the present disclosure provides an information processing device, applied to UDM, including: a first obtaining module, configured to obtain first authentication information and edge computing authorization information of a terminal; a first sending module, configured to send the first authentication information to a first network element; a second sending module, configured to send the edge computing authorization information to a second network element.

In an embodiment of the present disclosure, the first obtaining module is specifically configured to obtain an authentication result of the terminal from a third network element or a fourth network element, and verify edge computing capability of the terminal according to the authentication result and pre-stored edge computing service capability information of the terminal, obtain the first authentication information, and generating the edge computing authorization information of the terminal; or obtain the first authentication information of the terminal from the third network element or the fourth network element, and generating the edge computing authorization information of the terminal; or obtain the first authentication information preconfigured in the UDM.

In a tenth aspect, an embodiment of the present disclosure provides an information processing device, applied to a terminal, including: a first obtaining module, configured to obtain information of a second network element from a first network element; a second obtaining module, configured to obtain information of a target network element from the second network element according to the information of the second network element; wherein, the information of the second network element is sent by the first network element when authentication of the terminal is successful; the information of the target network element is sent to the terminal when edge calculation authorization information of the terminal is verified by the second network element.

In an embodiment of the present disclosure, the first obtaining module includes: a sending submodule, configured to send a second request to the first network element, so that the first network element authenticates the terminal according to the second request; a receiving sub-module, configured to receive the information of the second network element sent by the first network element, wherein the information of the second network element is sent when the terminal passes the authentication by the first network element.

In an eleventh aspect, an embodiment of the present disclosure provides an information processing device, applied to a first network element, including: a transceiver, a memory, a processor, and a program stored in the memory and executed by the processor; wherein the processor is configured to read the program in the memory to perform the following processes: obtaining first authentication information for a terminal; and in the case of determining that authentication of the terminal is successful according to the first authentication information, sending information of a second network element to the terminal, so that the terminal obtains information of a target network element from the second network element, the information of the target network element is sent by the second network element to the terminal when edge computing authorization information of the terminal is verified, and the target network element is used to provide an edge computing service for the terminal.

In an embodiment of the present disclosure, the processor is further configured to read a program in the memory to perform the following processes: obtaining the first authentication information from a unified data management entity (UDM); wherein, the first authentication information is obtained after the terminal is authenticated by a third network element located in a 3GPP network and stored in the UDM; or, the first authentication information is obtained after the UDM receives an authentication result of the terminal generated by the third network element located in the 3GPP network and performs verification on edge computing service capability of the terminal according to the authentication result; or, the first authentication information is obtained after the terminal is authenticated by a fourth network element and stored in the UDM, or, the first authentication information is obtained after the UDM receives an authentication result of the terminal generated by the fourth network element and performs verification on the edge computing service capability of the terminal according to the authentication result; or the first authentication information is obtained after the terminal is authenticated by an authentication network element in a DN and stored in the UDM or, the first authentication information is obtained after the UDM receives an authentication result of the terminal generated by the authentication network element in the DN and performs verification on the edge computing service capability of the terminal according to the authentication result.

In an embodiment of the present disclosure, the processor is further configured to read the program in the memory, performing the following processes: receiving a first request sent by the terminal, wherein the first request is used for requesting the edge computing service In an embodiment of the present disclosure, the processor is further configured to read the program in the memory to perform the following processes: receiving a second request from the terminal; authenticating the terminal according to the second request, and obtaining the first authentication information.

In an embodiment of the present disclosure, the processor is further configured to read the program in the memory to perform the following processes: receiving a third request from the second network element, wherein the third request is used to verify the edge computing authorization information of the terminal; obtaining a token according to the third request; and sending the token to the second network element.

In an embodiment of the present disclosure, the processor is further configured to read a program in the memory to perform a process of: performing mutual authentication with the UDM.

In a twelfth aspect, an embodiment of the present disclosure provides an information processing device, applied to a second network element, including: a transceiver, a memory, a processor, and a program stored in the memory and executed by the processor; wherein the processor is configured to read the program in memory to perform the following processes: obtaining edge computing authorization information of a terminal; in the case that the edge computing authorization information is verified, sending information of a target network element to the terminal, wherein the target network element is used to provide an edge computing service for the terminal.

In an embodiment of the present disclosure, the processor is further configured to read the program in the memory to perform the following processes: obtaining a token of the terminal from a UDM; or, obtaining a stored token; or, obtaining the token of the terminal from a first network element; wherein, the token indicates that the terminal has the ability to use the edge computing service.

In a thirteenth aspect, an embodiment of the present disclosure provides an information processing device, applied to a third network element, wherein the third network element is provided in a 3GPP network, including: a transceiver, a memory, a processor, and a program stored in the memory and executed by the processor; wherein the processor is configured to read the program in memory to perform the following processes: receiving a fourth request from a terminal, wherein the fourth request is used to indicate to request an edge computing service; obtaining first authentication information according to the fourth request; obtaining information of a first network element, and sending the information of the first network element to the terminal, so that the terminal interacts with the first network element, and the first network element performs authentication of the terminal according to the first authentication information.

In an embodiment of the present disclosure, the processor is further configured to read the program in the memory to perform the following processes: authenticating the terminal according to the fourth request to obtain the first authentication information.

In an embodiment of the present disclosure, the processor is further configured to read the program in the memory to perform the following processes: sending the first authentication information to a UDM, so that the UDM generates edge computing authorization information of the terminal.

In an embodiment of the present disclosure, the processor is further configured to read the program in the memory to perform the following: authenticating the terminal according to the fourth request, and obtaining an authentication result; sending the authentication result to the UDM, so that the UDM verifies edge computing capability of the terminal according to the authentication result and pre-stored edge computing service capability information of the terminal, obtains the first authentication information, and generates edge computing authorization information of the terminal.

In an embodiment of the present disclosure, the processor is further configured to read the program in the memory to perform the following processes: obtaining the information of the first network element from the UDM.

In a fourteenth aspect, an embodiment of the present disclosure provides an information processing device, applied to a UDM, including: a transceiver, a memory, a processor, and a program stored in the memory and executed by the processor; wherein the processor is configured to read the program in memory to perform the following processes: obtaining first authentication information and edge computing authorization information of a terminal; sending the first authentication information to a first network element; and sending the edge computing authorization information to a second network element.

In an embodiment of the present disclosure, the processor is further configured to read the program in the memory to perform the following processes: obtaining an authentication result of the terminal from a third network element or a fourth network element, and verifying edge computing capability of the terminal according to the authentication result and pre-stored edge computing service capability information of the terminal, obtaining the first authentication information, and generating the edge computing authorization information of the terminal; or obtaining the first authentication information of the terminal from the third network element or the fourth network element, and generating the edge computing authorization information of the terminal; or obtaining the first authentication information preconfigured in the UDM.

In an embodiment of the present disclosure, the processor is further configured to read the program in the memory to perform the following processes: performing mutual authentication with the first network element.

In an embodiment of the present disclosure, the processor is further configured to read the program in the memory to perform the following processes: pre-configuring subscription information of the terminal.

In a sixteenth aspect, an embodiment of the present disclosure provides an information processing device, applied to a terminal, including: a transceiver, a memory, a processor, and a program stored in the memory and executed by the processor; wherein the processor is configured to read the program in memory to perform the following processes: obtaining information of a second network element from a first network element; obtaining information of a target network element from the second network element according to the information of the second network element; wherein, the information of the second network element is sent by the first network element when authentication of the terminal is successful; the information of the target network element is sent to the terminal when edge calculation authorization information of the terminal is verified by the second network element.

In an embodiment of the present disclosure, the processor is further configured to read the program in the memory to perform the following processes: sending a first request to the first network element, wherein the first request is used to indicate to request an edge computing service; or sending a fourth request to a third network element request, and the fourth request is used to indicate to request the edge computing service.

In an embodiment of the present disclosure, the processor is further configured to read the program in the memory to perform the following processes: sending a second request to the first network element, so that the first network element authenticates the terminal according to the second request; receiving the information of the second network element sent by the first network element, wherein the information of the second network element is sent when the terminal passes the authentication by the first network element.

In a seventeenth aspect, an embodiment of the present disclosure provides a computer-readable storage medium for storing a computer program, wherein when the computer program is executed by a processor, the steps in the method are implemented.

In the embodiment of the present disclosure, in case of obtaining the authentication information of the terminal and the authentication information being verified, the information of the second network element is provided to the terminal, and then the edge computing service is provided for the terminal. Therefore, by using the solutions of the embodiments of the present disclosure, denial of service attack on the second network element can be reduced, thereby improving the security of edge computing services.

BRIEF DESCRIPTION OF THE DRAWINGS

In order to illustrate the technical solutions of the embodiments of the present disclosure more clearly, the following briefly introduces the accompanying drawings used in the description of the embodiments of the present disclosure. Obviously, the accompanying drawings in the following description are only used for some embodiments of the present disclosure. For those of ordinary skill in the art, other drawings can also be obtained from these drawings without creative work.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative work shall fall within the protection scope of the present disclosure.

Figure 1:
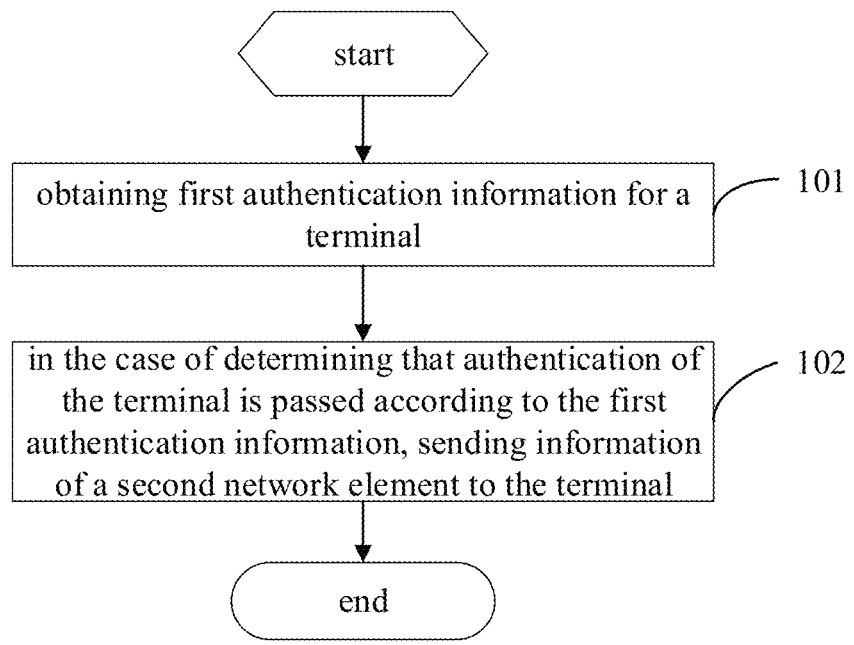
FIG. 1 is a first flowchart of the information processing method provided by an embodiment of the present disclosure.

FIG. 1 is a flowchart of an information processing method provided by an embodiment of the present disclosure, which is applied to a first network element. The first network element may be, for example, an edge configuration server. As shown in FIG. 1, the method includes the following steps:

Step 101: Obtaining first authentication information for a terminal.

Specifically, in this embodiment, the first network element obtains the first authentication information from the UDM. Wherein, the first authentication information can be obtained in various ways.

For example, the first authentication information is obtained after the terminal is authenticated by a third network element located in the 3GPP network (for example, it may be an Authentication Server Function (AUSF)) and stored in the UDM or, the first authentication information is obtained after the UDM receives an authentication result of the terminal by the third network element located in the 3GPP network and performs verification on the edge computing service capability of the terminal according to the authentication result; or, the first authentication information is obtained after the terminal is authenticated by a fourth network element (for example, it may be a session management function (SMF)) and is stored in the UDM, or, the first authentication information is obtained after the UDM receives an authentication result of the terminal by the fourth network element and performs verification on the edge computing service capability of the terminal according to the authentication result; or the first authentication information is obtained after the terminal is authenticated by an authentication network element in the DN and stored in the UDM or, the first authentication information is obtained after the UDM receives an authentication result of the terminal by the authentication network element in the DN and performs verification on the edge computing service capability of the terminal according to the authentication result.

Alternatively, in this embodiment, the first network element itself can also obtain the first authentication information. Specifically, the first network element receives a second request from the terminal, and then performs authentication on the terminal according to the second request to obtain the first authentication information.

Step 102: In the case of determining that the authentication of the terminal is successful according to the first authentication information, sending information of a second network element to the terminal, so that the terminal obtains information of a target network element from the second network element, the information of the target network element is sent by the second network element to the terminal when edge computing authorization information of the terminal is verified, and the target network element is used to provide edge computing services for the terminal.

The second network element may be, for example, an edge enabler server, and the target network element may be, for example, an edge application server. The information of the second network element may be, for example, an address and a name of the second network element.

In the embodiment of the present disclosure, in case of obtaining the authentication information of the terminal and the authentication information being verified, the information of the second network element is provided to the terminal, and then the edge computing service is provided for the terminal. Therefore, by using the solutions of the embodiments of the present disclosure, denial of service attack on the second network element can be reduced, thereby improving the security of edge computing services.

On the basis of the foregoing embodiment, before step 101, the method may further include: receiving a first request sent by the terminal, wherein the first request is used for requesting an edge computing service.

In the case that the first network element itself obtains the first authentication information, after step 102, the method may further include: receiving a third request from the second network element, wherein the third request is used to authenticate the edge computing authorization information of the terminal. A token is obtained according to the third request, and the token is sent to the second network element.

On the basis of the above embodiment, before step 101, in the case of obtaining the first authentication information from the UDM, the method may further include: performing mutual authentication with the UDM, thereby further improving security.

Figure 2:
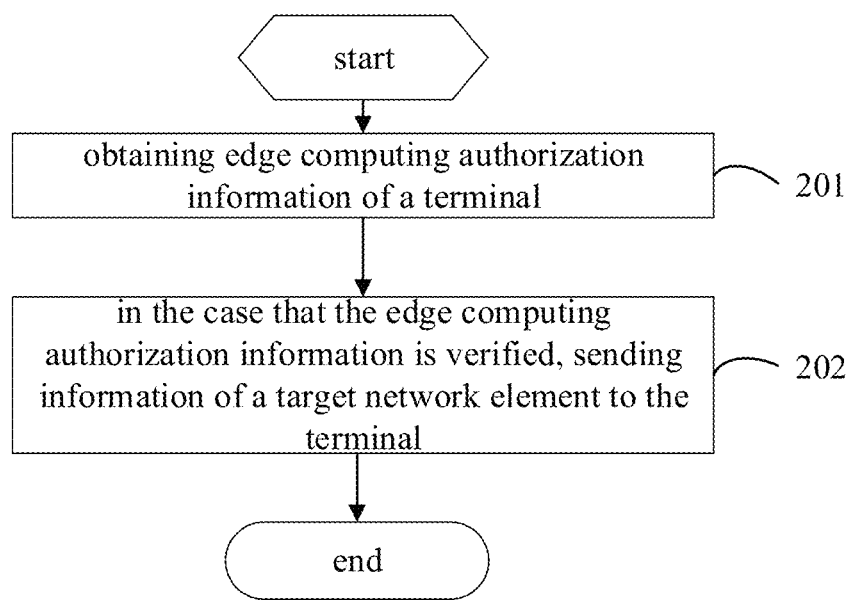
FIG. 2 is a second flowchart of the information processing method provided by the embodiment of the present disclosure.

FIG. 2 is a flowchart of an information processing method provided by an embodiment of the present disclosure. The second network element may be, for example, an edge enabler server. As shown in FIG. 2, the method includes the following steps:

Step 201: Obtaining edge computing authorization information of a terminal.

Optionally, in this step, the token of the terminal may be obtained from the UDM; or the token stored by terminal may be obtained; or the token of the terminal may be obtained from the first network element; wherein the token indicates that the terminal has the ability to use edge computing services.

Step 202: In the case that the edge computing authorization information is verified, sending information of a target network element to the terminal, wherein the target network element is used to provide an edge computing service for the terminal.

The information of the target network element may be, for example, an address and a name of the target network element.

In the embodiment of the present disclosure, the authentication information of the terminal is obtained, and only when the authentication information is verified, the information of the second network element is provided to the terminal, and then the edge computing service is provided for the terminal. Therefore, by using the solutions of the embodiments of the present disclosure, denial of service attack on the second network element can be reduced, thereby improving the security of edge computing services.

Figure 3:
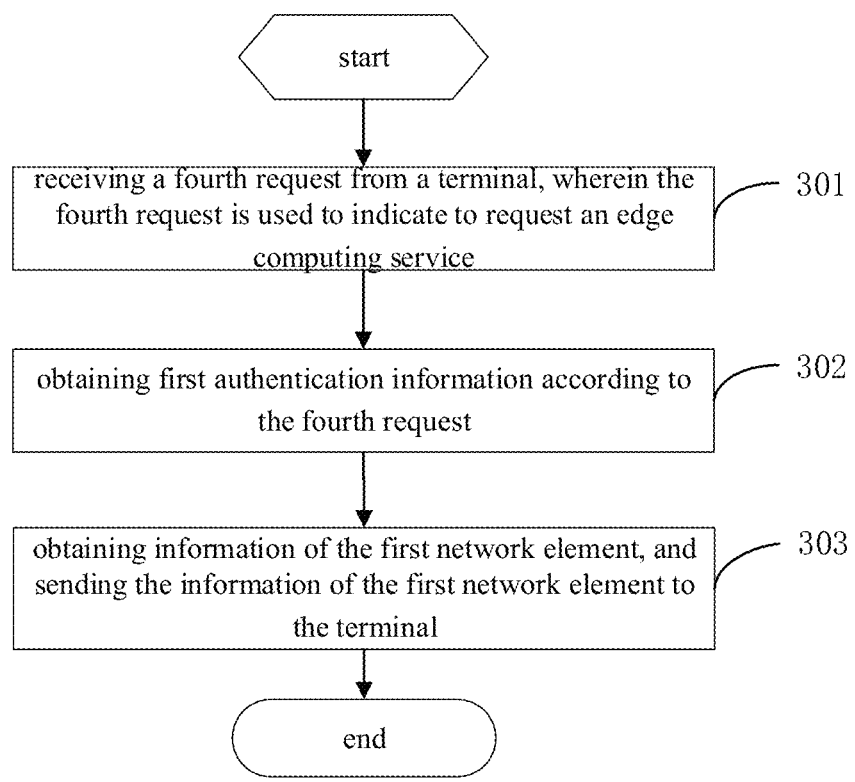
FIG. 3 is a third flowchart of an information processing method provided by an embodiment of the present disclosure.

FIG. 3 is a flowchart of an information processing method provided by an embodiment of the present disclosure. The third network element is provided in a 3GPP network, and may be, for example, an AUSF. As shown in FIG. 3, the method includes the following steps:

Step 301: Receiving a fourth request from a terminal, wherein the fourth request is used to indicate to request an edge computing service.

Step 302: Obtaining first authentication information according to the fourth request.

In this embodiment of the present disclosure, the terminal may be authenticated according to the fourth request to obtain the first authentication information. After this step, the method may further include: sending the first authentication information to the UDM, so that the UDM generates edge computing authorization information of the terminal.

Alternatively, in this step, the terminal may also be authenticated according to the fourth request to obtain an authentication result, and the authentication result may be sent to the UDM, so that the UDM can verify the edge computing capability of the terminal according to the authentication result and the pre-stored edge computing service capability information of the terminal, obtain the first authentication information, and generate edge computing authorization information of the terminal.

Step 303: obtaining information of the first network element, and sending the information of the first network element to the terminal, so that the terminal interacts with the first network element, and the first network element performs authentication of the terminal according to the first authentication information.

Specifically, in this step, the information of the first network element is obtained from the UDM.

In the embodiment of the present disclosure, the authentication information of the terminal is obtained, and only when the authentication information is verified, the information of the second network element is provided to the terminal, and then the edge computing service is provided for the terminal. Therefore, by using the solutions of the embodiments of the present disclosure, denial of service attack on the second network element can be reduced, thereby improving the security of edge computing services.

Figure 4:
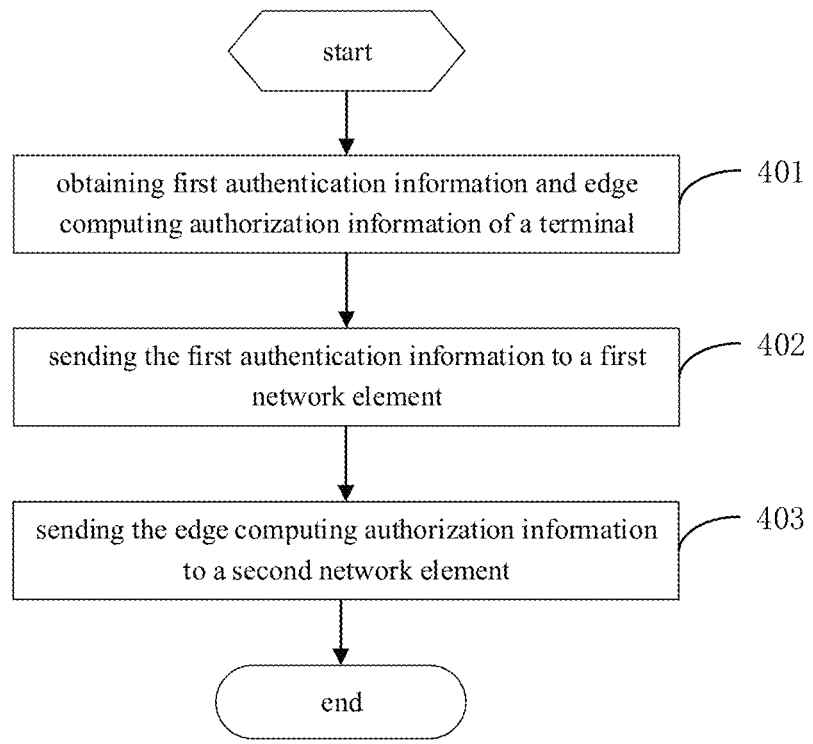
FIG. 4 is a fourth flowchart of the information processing method provided by the embodiment of the present disclosure.

FIG. 4 is a flowchart of an information processing method provided by an embodiment of the present disclosure, which is applied to UDM. As shown in FIG. 4, the method includes the following steps:

Step 401: Obtaining first authentication information of a terminal and edge computing authorization information.

Specifically, in this step, the authentication result of the terminal can be obtained from the third network element or the fourth network element, and the edge computer capability of the terminal can be verified according to the authentication result and the pre-stored edge computing service capability information of the terminal, to obtain the first authentication information, and generate the edge computing authorization information of the terminal; or the first authentication information of the terminal is obtained from the third network element or the fourth network element, and the edge computing authorization information of the terminal is generated; or the first authentication information preconfigured in the UDM is obtained.

Step 402: Sending the authentication information to the first network element.

Step 403: Sending the edge computing authorization information to the second network element.

In the embodiment of the present disclosure, the authentication information of the terminal is obtained, and only when the authentication information is verified, the information of the second network element is provided to the terminal, and then the edge computing service is provided for the terminal. Therefore, by using the solutions of the embodiments of the present disclosure, denial of service attack on the second network element can be reduced, thereby improving the security of edge computing services.

In the embodiment shown in FIG. 4, before step 402, mutual authentication with the first network element may also be included, so as to further improve the security.

Wherein, the subscription information of the terminal may also be preconfigured in the UDM.

Figure 5:
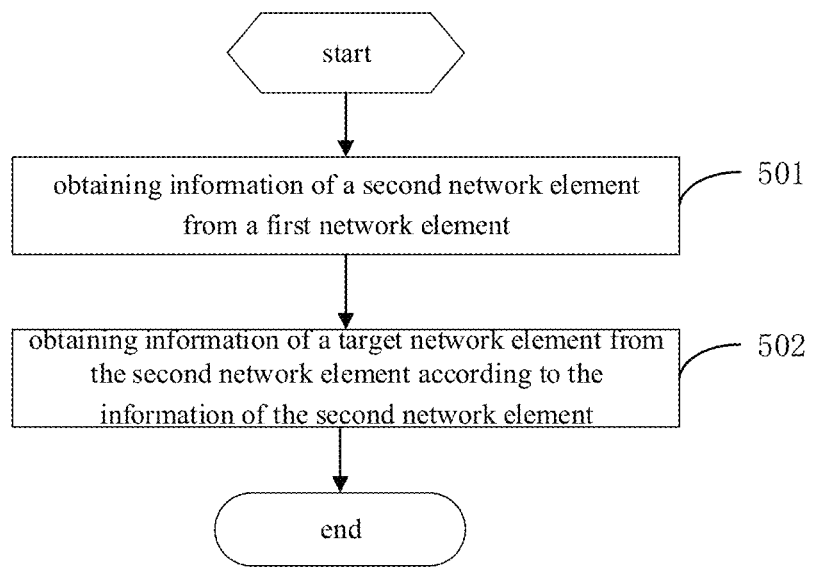
FIG. 5 is a fifth flowchart of the information processing method provided by the embodiment of the present disclosure.

FIG. 5 is a flowchart of an information processing method provided by an embodiment of the present disclosure, which is applied to a terminal. As shown in FIG. 5, the method includes the following steps:

Step 501: obtaining information of a second network element from a first network element.

Specifically, in this step, the terminal sends a second request to the first network element, so that the first network element performs authentication on the terminal according to the second request. Afterwards, the terminal receives the information of the second network element sent by the first network element, wherein the information of the second network element is sent when the terminal passes the authentication by the first network element.

Before this step, the method may further include: sending, by the terminal, a first request to the first network element, wherein the first request is used to indicate to request an edge computing service; or, the terminal sends a fourth request to a third network element, the fourth request is used to indicate to request an edge computing service.

Step 502: obtaining information of a target network element from the second network element according to the information of the second network element.

The information of the second network element is sent by the first network element when the authentication of the terminal is successful; the information of the target network element is sent to the terminal when the edge calculation authorization information of the terminal is verified by the second network element.

In the embodiment of the present disclosure, the authentication information of the terminal is obtained, and only when the authentication information is verified, the information of the second network element is provided to the terminal, and then the edge computing service is provided for the terminal. Therefore, by using the solutions of the embodiments of the present disclosure, a denial of service attack on the second network element can be reduced, thereby improving the security of edge computing services.

In the related art, the UE accesses the edge computing network for the first time by interacting with the edge configuration server. However, in the initial access process, the authorization of the UE identity and access authority is not implemented, but the service authorization is performed between the UE and the edge enabler server. The disadvantage of this design is that any client can apply to the edge enabler server for edge computing service authorization. Then, an attacker could exploit the vulnerability of this system to send a large number of requests, resulting in a denial of service attack on the edge enabler server.

In addition, for the edge configuration server, the Authentication Authorization Function (AAF) and the relationship between the 3GPP network and the edge computing network have unreasonable or unclear factors in the related art. Specifically, the position of the AAF as the authentication server is not clear, because there is no such network function in the architecture of the related art; secondly, the edge configuration server is currently between the edge computing network and the 3GPP network, and has no relationship with these two networks, cannot perform the configuration of the UE.

In the embodiment of the present disclosure, an information processing method is provided, so as to realize the authentication and authorization of the UE, and at the same time, the specific location of the edge configuration server is specified.

In one embodiment, the edge configuration server is provided in the edge computing network. Specifically: when the UE accesses the edge computing data network, authentication is achieved through the 3GPP network; when the UE accesses the edge computing network, the edge configuration server confirms the legitimacy of the UE identity by using the authentication information of the UE obtained from the 3GPP network.

The UE carries the edge computing service request in a registration request, and the 3GPP network completes the authentication of the UE. After that, the 3GPP network will store the authentication information for the edge computing service of the UE in the UDM. Of course, the edge computing service capability information of the UE may also be pre-configured in the UDM in an out-of-band manner. After the 3GPP network performs the authentication of the UE, the information of the edge configuration server is sent to the UE, so that the UE accesses the edge configuration server. When the edge configuration server receives the edge computing request from a user, the authentication information of the UE is obtained and verified, and then the information of the edge enabled server is returned. After that, the edge enabler server requests the UDM for edge computing service authorization information of the UE.

In one embodiment, the edge configuration server may be provided in a 3GPP operator network or a data network (DN). Specifically: the UE accesses the edge computing data network to achieve authentication through the 3GPP network, and can be further authorized by the DN data network. When the UE accesses the edge computing network, the edge configuration server (which can be the server of the DN data network) will confirm the legitimacy of the UE identity by using the authentication information of the UE obtained from the 3GPP network.

If the UE accesses the DN data network, the UE can provide secondary authentication for the UE, and the DN network can provide edge computing services. When the edge configuration server receives the edge computing request from a user, the edge computing server requests the edge computing service authentication information of the UE from the authentication, authorization, and accounting (AAA) of the DN network or the UDM.

In this case, the edge configuration server can combine the function of edge computing authentication with the edge computing authentication service.

In one embodiment, after the UE obtains the authentication information of the edge configuration server, the UE completes the authentication when initially establishing a connection with the edge configuration server. Authentication can be achieved through Transport Layer Security (TLS) or Network Data Service (NDS) or Extensible Authentication Protocol (EAP) authentication protocol at the transport layer, and the authentication is implemented through 3GPP network to instruct to implement optional secondary authentication.

Hereinafter, the implementation process of the information processing method according to the embodiment of the present disclosure will be described in detail with reference to different embodiments.

Figure 6:
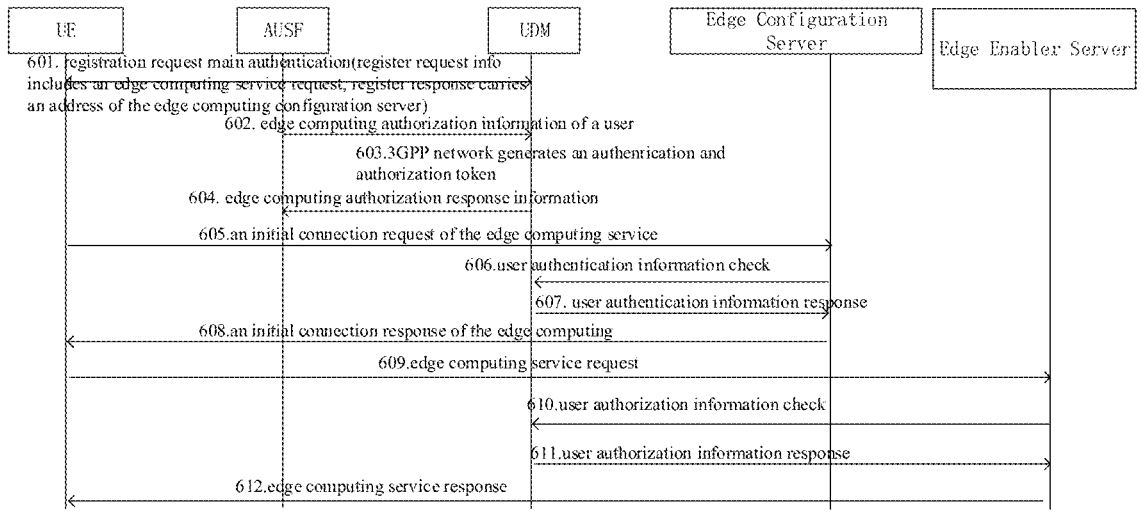
FIG. 6 is a sixth flowchart of the information processing method provided by the embodiment of the present disclosure.

As shown in FIG. 6, it is a flowchart of an information processing method according to an embodiment of the present disclosure. In this embodiment, the edge configuration server belongs to the edge computing network. The edge configuration server performs the authentication of the UE, and the edge enablement server performs the authorization of the UE. This embodiment includes the following processes.

Step 601: The UE initiates a registration request main authentication process to the 3GPP network, carries a service request of edge computing, and requests to obtain information of an edge configuration server.

The 3GPP network completes the authentication of the UE, and the authenticated UE may have the information of the edge computing configuration server.

Step 602: After the AUSF and the UE complete the two-way primary authentication, the AUSF sends the edge computing authorization information of a user to the UDM, including the edge computing service request of the UE, the UE identity, and information of the selected edge computing configuration server. The service subscription information of the edge computing of the user can also be stored in the UDM.

Step 603: The UDM generates an edge computing authorization token, which identifies that the user has an ability to use the edge computing service.

Step 604: the UMD sends edge computing authorization response information to the AUSF to inform the AUSF that the edge computing authorization information for the UE has been generated.

Step 605: The UE sends an initial connection request of the edge computing service to the edge configuration server through the information of the edge configuration server sent by the AUSF, and accesses the edge configuration server.

Step 606: After the edge configuration server receives the request from the UE, the edge configuration server sends a user authentication information check request to the UDM, requesting the edge computing service authentication information of the UE.

Step 607: The UDM returns the edge computing service authentication information of the UE through the user authentication information response.

Step 608: The edge configuration server sends an initial connection response of the edge computing service to the UE, which carries the information of the edge enabler server.

Step 609: The UE sends an edge computing service request to the edge computing enabler server to request the service.

Step 610: The edge enabler server requests the UDM for edge computing authorization information, such as a Token, of the UE.

Step 611: the UDM returns a user authorization information response to the edge enabler server, and returns a Token.

Step 612: The edge enabler server sends an edge computing service response to the UE, that is, sending the information of the edge application server to the UE.

Figure 7:
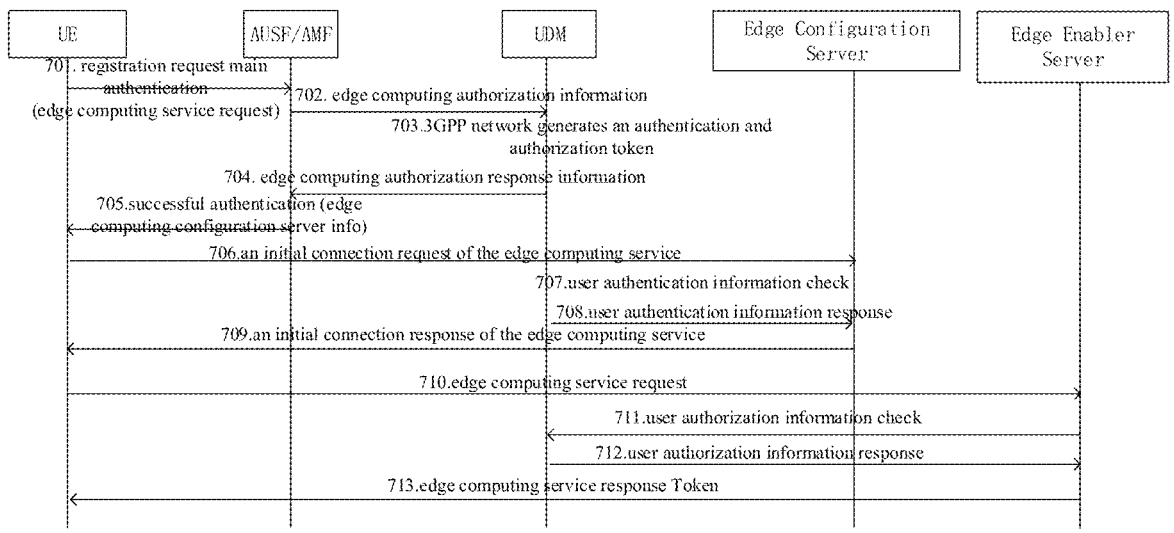
FIG. 7 is a seventh flowchart of an information processing method provided by an embodiment of the present disclosure.

As shown in FIG. 7, it is a flowchart of an information processing method according to an embodiment of the present disclosure. In this embodiment, the edge configuration server belongs to the edge computing network. The service capabilities of edge computing of the UE are pre-configured in UDM. When the UE registers with the network, the AUSF will query the UDM. If the query is successful and it is obtained that UE can execute the edge computing service, the UDM will send a confirmation message to the AUSF. The AUSF will pass the authentication success or indicate the AMF that the UE has the edge computing service capability, so that the AUSF or the AMF selects an edge configuration server and sends the address or information of the server to the UE through the authentication success message. This embodiment includes the following processes.

Step 701: the UE initiates a registration request main authentication process to a 3GPP network (such as AUSF), carrying a service request for edge computing. The AUSF completes the authentication of the UE.

Step 702: The AUSF sends edge computing authorization information to the UDM, requesting to verify the edge computing capability of the UE.

Step 703: The UDM verifies the edge computing capability of the UE, and generates edge computing authentication information, where the authentication information identifies that the UE has the capability to use the edge computing service. In addition, UDM generates an authorization token for edge computing.

Step 704: The UMD sends edge computing authorization response information to the AUSF or AMF to inform the AUSF or AMF of the information of the edge configuration server.

Step 705: If the authentication is successful, the AUSF or AMF returns the information of the edge configuration server.

Step 706: The UE sends an initial connection request of the edge computing service to the edge configuration server through the information of the edge configuration server sent by the AUSF, and accesses the edge configuration server.

Step 707: After the edge configuration server receives the request from the UE, the edge configuration server sends a user authentication information check request to the UDM, requesting the edge computing service authentication information of the UE.

Step 708: The UDM returns the edge computing service authentication information of the UE.

Step 709: The edge configuration server sends an initial connection response of the edge computing service to the UE, which carries the information of the edge enabler server.

Step 710: The UE sends an edge computing service request to the edge computing enabler server to request the service.

Step 711: The edge enabler server requests the UDM for edge computing authorization information, such as Token, of the UE.

Step 712: the UDM returns a user authorization information response to the edge enabler server, and returns a Token.

Step 713: The edge enabler server sends an edge computing service response to the UE, that is, sending the information of the edge application server to the UE.

Figure 8:
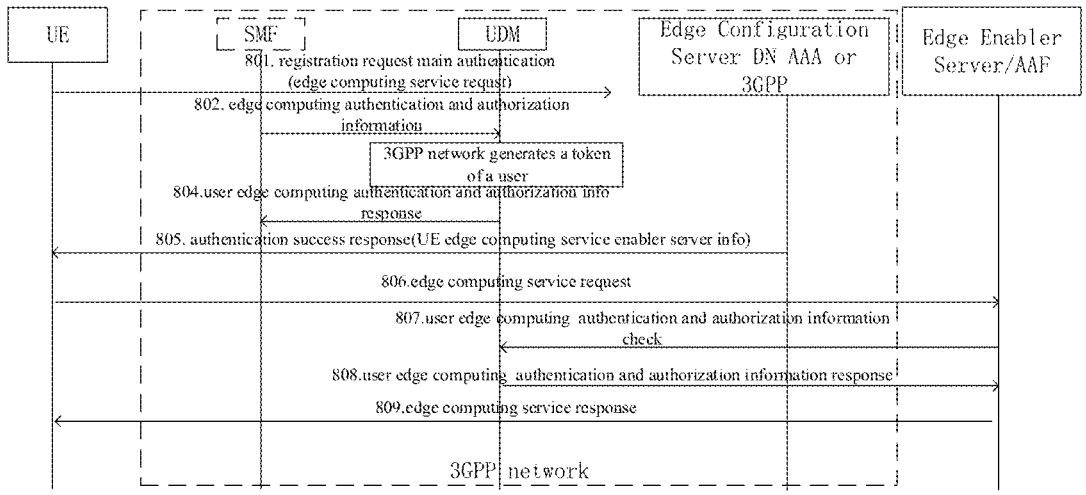
FIG. 8 is an eighth flow chart of the information processing method provided by the embodiment of the present disclosure.

As shown in FIG. 8, it is a flowchart of an information processing method according to an embodiment of the present disclosure. In this embodiment, the edge configuration server is provided in the 3GPP network or the DN network. The edge configuration server (the entity where the UE accesses the edge computing network for the first time) completes the authentication, and the enabler server completes the authorization. The edge configuration server is implemented by entities such as 3GPP network entity (AUSF) or DN data AAA. In this embodiment, if an independent authentication and authorization function is set on the edge computing network, the edge enabler server or the AAF needs to perform steps 806 and 807, so that the edge enabler server or the AAF and the UDM complete the authentication and authorization of the UE. This embodiment includes the following processes.

Step 801: the UE initiates a registration request main authentication process to the edge configuration server, and the registration request carries a service request of edge computing.

The 3GPP network or the DN data network completes the primary authentication and optional secondary authentication of the UE.

Step 802: The SMF sends edge computing authentication and authorization information to the UDM.

Step 803: An authentication and authorization Token for edge computing is generated in the UDM, and the Token identifies that the user has the ability to use the edge computing service.

Step 804: the UMD sends edge computing authorization response information to the SMF, notifying that the edge computing authorization information for the UE has been generated.

Wherein, steps 801-804 may also refer to the implementation process of 701-704 in the embodiment shown in FIG. 7.

Step 805: the information of the edge enabler server is carried in the authentication success response of the primary authentication or the secondary authentication, and is sent to the UE.

Step 806: The UE accesses the edge computing network through the information of the edge enabler server sent by the operator network, and initiates an edge computing service request.

Step 807: After the edge computing enabler server receives the edge computing service request from the user, the edge computing enabler server requests the UDM for edge computing service authentication and authorization information of the UE.

Step 808: the UDM returns a user authorization information response to the edge enabler server, and returns a Token.

Step 809: The edge enabler server sends an edge computing service response to the UE, that is, sending the information of the edge application server to the UE.

Figure 9:
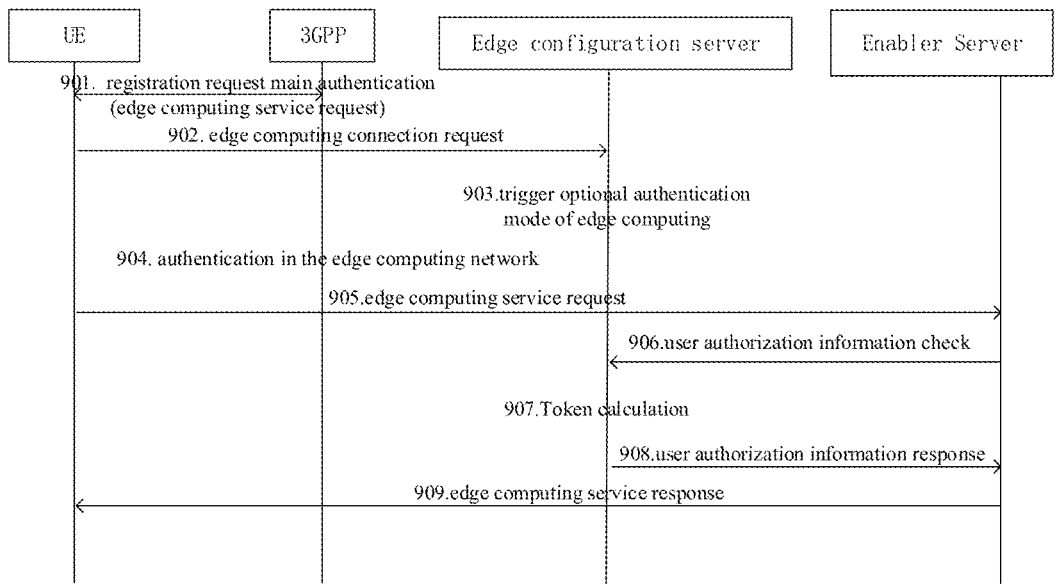
FIG. 9 is a ninth flow chart of the information processing method provided by the embodiment of the present disclosure.

As shown in FIG. 9, it is a flowchart of an information processing method according to an embodiment of the present disclosure. In this embodiment, the UE performs primary authentication with the 3GPP network. After the UE initially accesses the edge computing network, the edge configuration server and the UE perform optional authentication, and the authentication method may be an authentication method of the transport layer or an authentication method of the network layer. In this embodiment, the authorization of the UE by the edge computing network may also adopt the Oauth2.0 authorization framework of the application layer according to the authentication result of the UE by the edge configuration server. This embodiment includes the following processes.

Step 901: the UE initiates a registration request main authentication process to the 3GPP network, carrying the edge computing service request.

The UE performs primary authentication with the 3GPP network and obtains the address of the edge computing configuration service.

Step 902: the UE sends an edge computing connection request to the edge configuration server.

Step 903: The edge configuration server selects an authentication mode to authenticate the UE.

The authentication method may be TLS, NDS/IP, EAP-AKA, and the authentication and key agreement (AKA) and the like.

Step 904: the edge configuration server performs authentication with the UE, and after the authentication is successful, the UE obtains the address of the edge enabler server.

Step 905: the UE sends an edge computing service request to the edge enabler server.

Step 906: After the edge enabler server receives the edge computing service request, the edge enabler server requests the edge configuration server for the edge computing service authentication and authorization information of the UE.

Step 907: the edge configuration server calculates the Token.

Step 908: The edge configuration server sends a user authorization information response to the edge enabler server, which carries the Token.

Step 909: The edge enabler server sends an edge computing service response to the UE, that is, sending the information of the edge application server to the UE.

Figure 10:
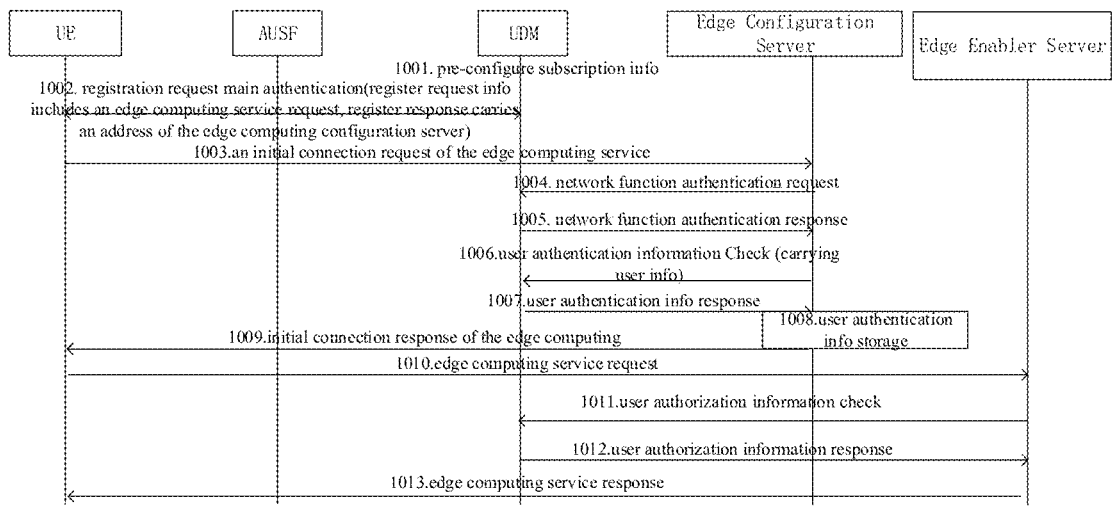
FIG. 10 is a tenth flow chart of the information processing method provided by the embodiment of the present disclosure.

As shown in FIG. 10, it is a flowchart of an information processing method according to an embodiment of the present disclosure. In this embodiment, the subscription information of the terminal is preconfigured in the UDM.

This embodiment includes the following processes:

Step 1001: the subscription information of the UE is pre-configured in the UDM.

Step 1002: the UE and the 3GPP network perform a registration request main authentication process, and the registration request message carries the edge computing server request. After completing the main authentication, the UE obtains the information of the edge computing configuration server.

Step 1003: the UE sends an initial connection request of the edge computing service to the edge configuration server.

The edge configuration server and the UDM perform service function authentication, so that the UDM and the configuration server perform mutual authentication. Specifically, it can include the following steps.

Step 1004: The edge configuration server sends a network function authentication request to the UDM.

Step 1005: the UDM sends a network function authentication response to the edge configuration server.

Step 1006: After the authentication is completed, the edge configuration server sends a user authentication information Check request to the UDM, requests the edge computing service authentication information of the UE, and obtains the edge computing service authentication information of the UE.

Step 1007: the UDM returns the edge computing service authentication information of the UE.

Step 1008: The edge configuration server stores the edge computing service authentication information of the UE.

Step 1009: The edge configuration server sends an initial connection response of the edge computing service to the UE, which carries the information of the edge enabler server.

Step 1010: The UE sends an edge computing service request to the edge computing enabler server to request the service.

Step 1011: the edge enabler server sends a user authorization information Check request to the UDM, requesting the edge computing service authorization information, such as Token, of the UE.

Step 1012: the UDM returns a user authorization information response to the edge enabler server, and returns a Token.

Step 1013: The edge enabler server sends an edge computing service response to the UE, that is, sending the information of the edge application server to the UE.

It can be seen from the above that in the embodiments of the present disclosure, it is clarified that the authentication logic of the edge computing service UE, the Dos attack which is caused because the authentication is not performed when UE requests the edge computing service is avoided.

Figure 11:
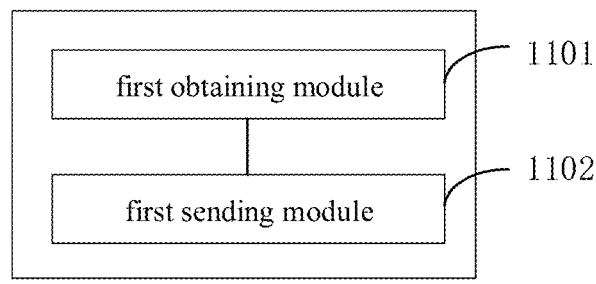
FIG. 11 is a first structural diagram of an information processing apparatus provided by an embodiment of the present disclosure.

The embodiment of the present disclosure further provides an information processing device, which is applied to a first network element. FIG. 11 is a structural diagram of an information processing device provided by an embodiment of the present disclosure. Since the principle of the information processing device for solving the problem is similar to that of the information processing method in the embodiment of the present disclosure, the implementation of the information processing device may refer to the implementation of the method, and the repetition will not be repeated.

As shown in FIG. 11, the information processing device includes: a first obtaining module 1101, configured to obtain first authentication information for a terminal; and a first sending module 1102, configured to, in the case of determining that the authentication of the terminal is successful according to the first authentication information, send information of a second network element to the terminal, so that the terminal obtains information of a target network element from the second network element, the information of the target network element is sent by the second network element to the terminal when edge computing authorization information of the terminal is verified, and the target network element is used to provide edge computing services for the terminal.

Optionally, the first obtaining module is specifically configured to obtain the first authentication information from the UDM;

Wherein, the first authentication information is obtained after the terminal is authenticated by a third network element located in the 3GPP network (for example, it may be an Authentication Server Function (AUSF)) and stored in the UDM or, the first authentication information is obtained after the UDM receives an authentication result of the terminal by the third network element located in the 3GPP network and performs verification on the edge computing service capability of the terminal according to the authentication result; or, the first authentication information is obtained after the terminal is authenticated by a fourth network element (for example, it may be a session management function (SMF)) and is stored in the UDM, or, the first authentication information is obtained after the UDM receives an authentication result of the terminal by the fourth network element and performs verification on the edge computing service capability of the terminal according to the authentication result; or the first authentication information is obtained after the terminal is authenticated by an authentication network element in the DN and stored in the UDM or, the first authentication information is obtained after the UDM receives an authentication result of the terminal by the authentication network element in the DN and performs verification on the edge computing service capability of the terminal according to the authentication result.

Optionally, the device may further include: a first receiving module, configured to receive a first request sent by the terminal, wherein the first request is used for requesting an edge computing service.

Optionally, the first obtaining module 1101 may include: a receiving sub-module, configured to receive a second request from the terminal; an authentication sub-module, configured to authenticate the terminal according to the second request, and obtain the first authentication information.

Optionally, the device may further include: a second receiving module, configured to receive a third request from the second network element, wherein the third request is used to authenticate the edge computing authorization information of the terminal; a second obtaining module, configured to obtain a token according to the third request; and a second sending module, configured to send the token to the second network element.

Optionally, the device may further include: an authentication module configured to perform mutual authentication with the UDM.

The device provided by the embodiment of the present disclosure can execute the foregoing method embodiments, and the implementation principles and technical effects thereof are similar, and details are not described herein again in this embodiment.

Figure 12:
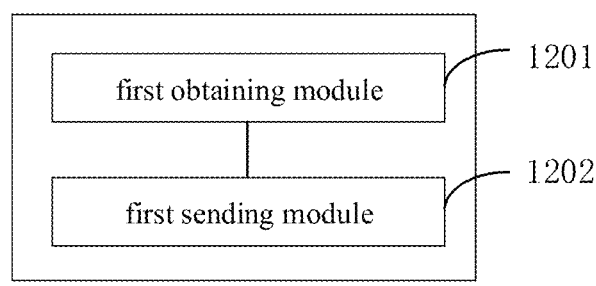
FIG. 12 is a second structural diagram of an information processing apparatus provided by an embodiment of the present disclosure.

The embodiments of the present disclosure further provide an information processing device, which is applied to a second network element. FIG. 12 is a structural diagram of an information processing device provided by an embodiment of the present disclosure. Since the principle of the information processing device for solving the problem is similar to that of the information processing method in the embodiment of the present disclosure, the implementation of the information processing device may refer to the implementation of the method, and the repetition will not be repeated.

As shown in FIG. 12, the information processing device includes: a first obtaining module 1201, configured to obtain edge computing authorization information of a terminal; a first sending module 1202, configured to, in the case that the edge computing authorization information is verified, send information of a target network element to the terminal, wherein the target network element is used to provide an edge computing service for the terminal.

Optionally, the first obtaining module 1201 is specifically configured to obtain a token of the terminal from the UDM; or, obtain a stored token; or, obtain the token of the terminal from the first network element; wherein, the token indicates that the terminal has the ability to use edge computing services.

The device provided by the embodiment of the present disclosure can execute the foregoing method embodiments, and the implementation principles and technical effects thereof are similar, and details are not described herein again in this embodiment.

Figure 13:
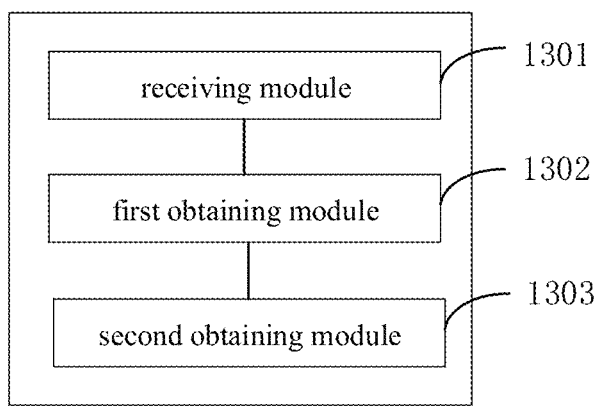
FIG. 13 is a third structural diagram of an information processing apparatus provided by an embodiment of the present disclosure.

An embodiment of the present disclosure further provides an information processing device, which is applied to a third network element, where the third network element is provided in a 3GPP network. FIG. 13 is a structural diagram of an information processing device provided by an embodiment of the present disclosure. Since the principle of the information processing device for solving the problem is similar to that of the information processing method in the embodiment of the present disclosure, the implementation of the information processing device may refer to the implementation of the method, and the repetition will not be repeated.

As shown in FIG. 13, the information processing device includes: a receiving module 1301, configured to receive a fourth request from a terminal, wherein the fourth request is used to indicate to request an edge computing service; a first obtaining module 1302, configured to obtain first authentication information according to the fourth request; a second obtaining module 1303, configured to obtain information of the first network element, and send the information of the first network element to the terminal, so that the terminal interacts with the first network element, and the first network element performs authentication of the terminal according to the first authentication information.

Optionally, the first obtaining module 1302 is specifically configured to authenticate the terminal according to the fourth request to obtain the first authentication information.

Optionally, the device may further include: a first sending module, configured to send the first authentication information to the UDM, so that the UDM generates edge computing authorization information of the terminal.

Optionally, the first obtaining module 1302 may include: an authentication sub-module, configured to authenticate the terminal according to the fourth request, and obtain an authentication result; a sending sub-module, configured to send the authentication result to the UDM, so that the UDM can verify the edge computing capability of the terminal according to the authentication result and the pre-stored edge computing service capability information of the terminal, obtain the first authentication information, and generate edge computing authorization information of the terminal.

Optionally, the first obtaining module 1302 may be configured to obtain the information of the first network element from the UDM.

The device provided by the embodiment of the present disclosure can execute the foregoing method embodiments, and the implementation principles and technical effects thereof are similar, and details are not described herein again in this embodiment.

Figure 14:
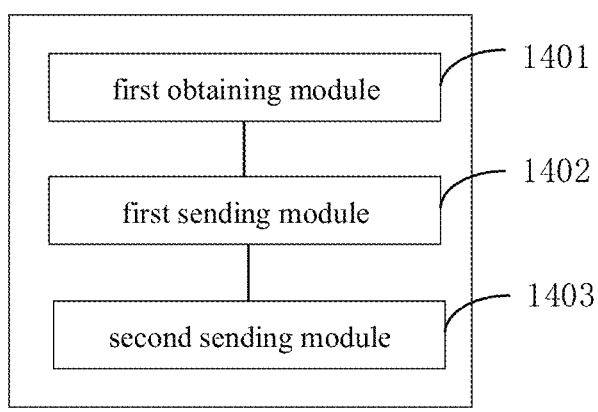
FIG. 14 is a fourth structural diagram of an information processing apparatus provided by an embodiment of the present disclosure.

The embodiments of the present disclosure also provide an information processing device, which is applied to UDM. FIG. 14 is a structural diagram of an information processing device provided by an embodiment of the present disclosure. Since the principle of the information processing device for solving the problem is similar to that of the information processing method in the embodiment of the present disclosure, the implementation of the information processing device may refer to the implementation of the method, and the repetition will not be repeated.

As shown in FIG. 14, the information processing device includes: a first obtaining module 1401, configured to obtain first authentication information of a terminal and edge computing authorization information; and a first sending module 1402, configured to send the authentication information to the first network element; and a second sending module 1403, configured to send the edge computing authorization information to the second network element.

Optionally, the first obtaining module 1401 is specifically configured to obtain the authentication result of the terminal from the third network element or the fourth network element, and verify the edge computing capability of the terminal according to the authentication result and the pre-stored edge computing service capability information of the terminal, obtain the first authentication information, and generate the edge computing authorization information of the terminal; or obtain the first authentication information of the terminal from the third network element or the fourth network element, and generate edge computing authorization information of the terminal; or obtain the first authentication information preconfigured in the UDM.

Optionally, the device may further include: an authentication module, configured to perform mutual authentication with the first network element.

Optionally, the device may further include: a pre-configuration module, configured to pre-configure subscription information of the terminal.

The device provided by the embodiment of the present disclosure can execute the foregoing method embodiments, and the implementation principles and technical effects thereof are similar, and details are not described herein again in this embodiment.

Figure 15:
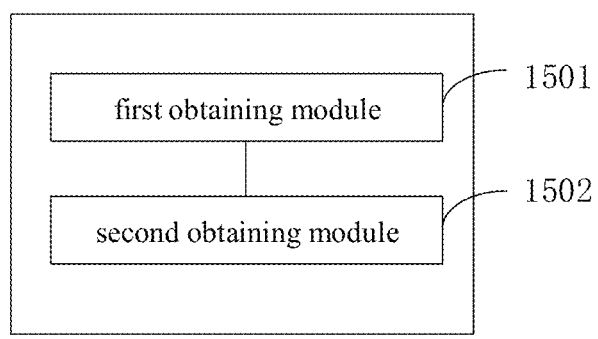
FIG. 15 is a fifth structural diagram of an information processing apparatus provided by an embodiment of the present disclosure.

The embodiments of the present disclosure also provide an information processing device, which is applied to a terminal. FIG. 15 is a structural diagram of an information processing device provided by an embodiment of the present disclosure. Since the principle of the information processing device for solving the problem is similar to that of the information processing method in the embodiment of the present disclosure, the implementation of the information processing device may refer to the implementation of the method, and the repetition will not be repeated.

As shown in FIG. 15, the information processing device includes: a first obtaining module 1501, configured to obtain information of a second network element from a first network element; and a second obtaining module 1502, configured to obtain information of a target network element from the second network element according to the information of the second network element; wherein, the information of the second network element is sent by the first network element when the authentication of the terminal is successful; the information of the target network element is sent to the terminal when the edge calculation authorization information of the terminal is verified by the second network element.

Optionally, the first obtaining module 1501 includes: a sending sub-module, configured to send a second request to the first network element, so that the first network element authenticates the terminal according to the second request; a receiving sub-module, configured to receive information of the second network element sent by the first network element, wherein the information of the second network element is sent when the terminal passes the authentication by the first network element.

Optionally, the device may further include: a sending module, configured to send a first request to the first network element, wherein the first request is used to indicate to request an edge computing service; or send a fourth request to a third network element request, and the fourth request is used to indicate to request an edge computing service.

The device provided by the embodiment of the present disclosure can execute the foregoing method embodiments, and the implementation principles and technical effects thereof are similar, and details are not described herein again in this embodiment.

Figure 16:
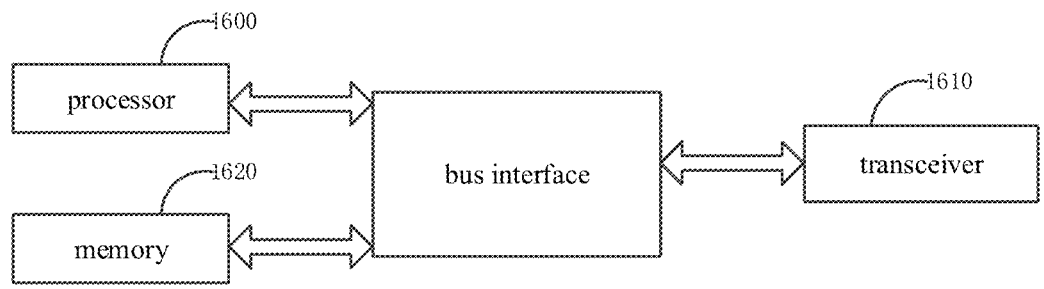
FIG. 16 is a first structural diagram of an information processing device provided by an embodiment of the present disclosure.

As shown in FIG. 16, the information processing device according to the embodiment of the present disclosure, applied to a first network element, includes: a processor 1600, configured to read a program in the memory 1620, and perform the following processes:
  obtaining first authentication information for a terminal; and
  in the case of determining that the authentication of the terminal is successful according to the first authentication information, sending information of a second network element to the terminal, so that the terminal obtains information of a target network element from the second network element, the information of the target network element is sent by the second network element to the terminal when edge computing authorization information of the terminal is verified, and the target network element is used to provide edge computing services for the terminal.

The transceiver 1610 is used to receive and send data under the control of the processor 1600.

In FIG. 16, the bus architecture may include any number of interconnected buses and bridges, specifically various circuits of one or more processors represented by processor 1600 and memory represented by memory 1620 are linked together. The bus architecture may also link together various other circuits, such as peripherals, voltage regulators, and power management circuits, which are well known in the art and, therefore, will not be described further herein. The bus interface provides the interface. Transceiver 1610 may be a number of elements, including a transmitter and a transceiver, units for communicating with various other devices over a transmission medium. The processor 1600 is responsible for managing the bus architecture and general processing, and the memory 1620 may store data used by the processor 1600 in performing operations.

The processor 1600 is responsible for managing the bus architecture and general processing, and the memory 1620 may store data used by the processor 1600 in performing operations.

The processor 1600 is also used to read the program, and execute the following steps:
  obtaining the first authentication information from the UDM;
  Wherein, the first authentication information is obtained after the terminal is authenticated by a third network element located in the 3GPP network and stored in the UDM or, the first authentication information is obtained after the UDM receives an authentication result of the terminal by the third network element located in the 3GPP network and performs verification on the edge computing service capability of the terminal according to the authentication result; or, the first authentication information is obtained after the terminal is authenticated by a fourth network element and is stored in the UDM, or, the first authentication information is obtained after the UDM receives an authentication result of the terminal by the fourth network element and performs verification on the edge computing service capability of the terminal according to the authentication result; or the first authentication information is obtained after the terminal is authenticated by an authentication network element in the DN and stored in the UDM or, the first authentication information is obtained after the UDM receives an authentication result of the terminal by the authentication network element in the DN and performs verification on the edge computing service capability of the terminal according to the authentication result.

The processor 1600 is also used to read the program, and execute the following steps:
  receiving a first request sent by the terminal, wherein the first request is used for requesting an edge computing service.

The processor 1600 is also used to read the program, and execute the following steps:
  receiving a second request from the terminal;
  authenticating the terminal according to the second request, and obtaining the first authentication information.

The processor 1600 is also used to read the program, and execute the following steps:
  receiving a third request from the second network element, wherein the third request is used to authenticate the edge computing authorization information of the terminal;
  obtaining a token according to the third request; and
  sending the token to the second network element.

The processor 1600 is also used to read the program, and execute the following steps:
  performing mutual authentication with the UDM.

The device provided by the embodiment of the present disclosure can execute the foregoing method embodiments, and the implementation principles and technical effects thereof are similar, and details are not described herein again in this embodiment.

Figure 17:
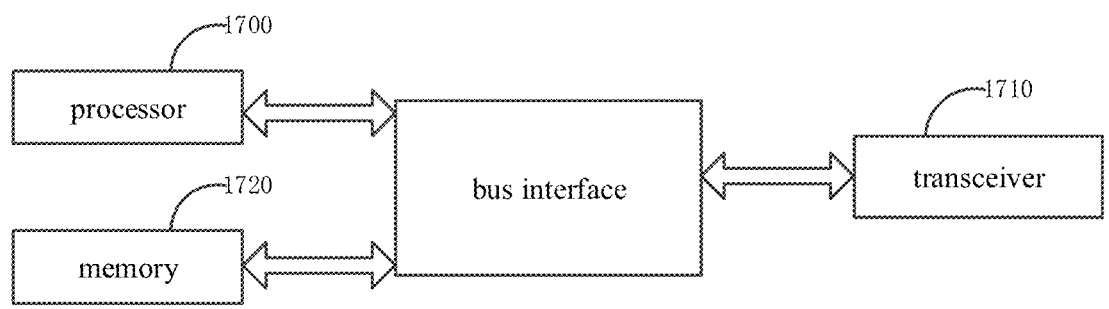
FIG. 17 is a second structural diagram of an information processing device provided by an embodiment of the present disclosure.

As shown in FIG. 17, the information processing device according to the embodiment of the present disclosure, applied to a second network element, includes: a processor 1700, configured to read a program in the memory 1720, and perform the following processes:
  obtaining edge computing authorization information of a terminal;
  in the case that the edge computing authorization information is verified, sending information of a target network element to the terminal, wherein the target network element is used to provide an edge computing service for the terminal.

The transceiver 1710 is used to receive and transmit data under the control of the processor 1700.

As shown in FIG. 17, the bus architecture may include any number of interconnected buses and bridges, specifically various circuits of one or more processors represented by processor 1700 and memory represented by memory 1720 are linked together. The bus architecture may also link together various other circuits, such as peripherals, voltage regulators, and power management circuits, which are well known in the art and, therefore, will not be described further herein. The bus interface provides the interface. Transceiver 1710 may be a number of elements, including a transmitter and a transceiver, units for communicating with various other devices over a transmission medium. The processor 1700 is responsible for managing the bus architecture and general processing, and the memory 1720 may store data used by the processor 1700 in performing operations.

The processor 1700 is responsible for managing the bus architecture and general processing, and the memory 1720 may store data used by the processor 1700 in performing operations.

The processor 1700 is also used to read the program, and perform the following steps:
  obtaining a token of the terminal from the UDM; or,
  obtaining a stored token; or,
  obtaining the token of the terminal from the first network element;
  wherein, the token indicates that the terminal has the ability to use edge computing services.

The device provided by the embodiment of the present disclosure can execute the above method embodiments, and the implementation principles and technical effects thereof are similar, and details are not described herein again in this embodiment.

Figure 18:
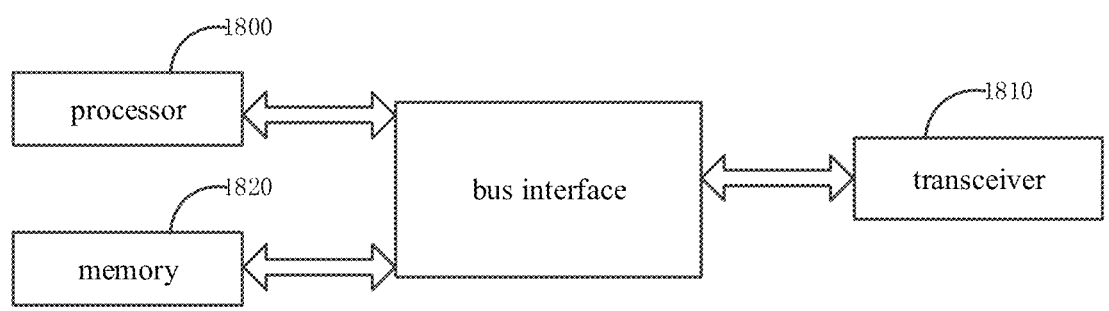
FIG. 18 is a third structural diagram of an information processing device provided by an embodiment of the present disclosure.

As shown in FIG. 18, the information processing device according to the embodiment of the present disclosure, applied to a second network element, includes: a processor 1800, configured to read a program in the memory 1820, and perform the following processes:
  receiving a fourth request from a terminal, wherein the fourth request is used to indicate to request an edge computing service;
  obtaining first authentication information according to the fourth request;
  obtaining information of the first network element, and sending the information of the first network element to the terminal, so that the terminal interacts with the first network element, and the first network element performs authentication of the terminal according to the first authentication information.

The transceiver 1810 is used to receive and transmit data under the control of the processor 1800.

As shown in FIG. 18, the bus architecture may include any number of interconnected buses and bridges, specifically various circuits of one or more processors represented by processor 1800 and memory represented by memory 1820 are linked together. The bus architecture may also link together various other circuits, such as peripherals, voltage regulators, and power management circuits, which are well known in the art and, therefore, will not be described further herein. The bus interface provides the interface. Transceiver 1810 may be a number of elements, including a transmitter and a transceiver, units for communicating with various other devices over a transmission medium. The processor 1800 is responsible for managing the bus architecture and general processing, and the memory 1820 may store data used by the processor 1800 in performing operations.

The processor 1800 is responsible for managing the bus architecture and general processing, and the memory 1820 may store data used by the processor 1800 in performing operations.

The processor 1800 is also used to read the program, and perform the following steps:
  authenticating the terminal according to the fourth request to obtain the first authentication information.

The processor 1800 is also used to read the program, and perform the following steps:
  sending the first authentication information to the UDM, so that the UDM generates edge computing authorization information of the terminal.

The processor 1800 is also used to read the program, and perform the following steps:
  authenticating the terminal according to the fourth request, and obtaining an authentication result;
  sending the authentication result to the UDM, so that the UDM can verify the edge computing capability of the terminal according to the authentication result and the pre-stored edge computing service capability information of the terminal, obtain the first authentication information, and generate edge computing authorization information of the terminal.

The processor 1800 is also used to read the program, and perform the following steps:
  Obtaining the information of the first network element from the UDM.

The device provided by the embodiment of the present disclosure can execute the above method embodiments, and the implementation principles and technical effects thereof are similar, and details are not described herein again in this embodiment.

Figure 19:
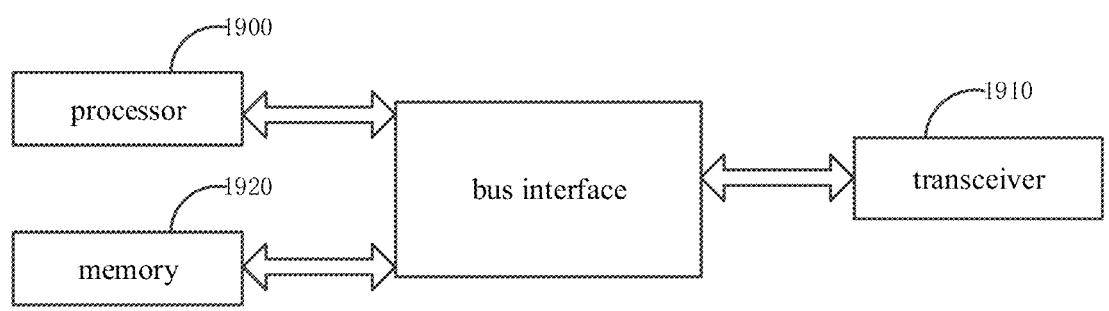
FIG. 19 is a fourth structural diagram of an information processing device provided by an embodiment of the present disclosure.

As shown in FIG. 19, the information processing device according to the embodiment of the present disclosure, applied to UDM, includes: a processor 1900, configured to read a program in a memory 1920, and execute the following processes:
  obtaining first authentication information of a terminal and edge computing authorization information;
  sending the authentication information to the first network element; and
  sending the edge computing authorization information to the second network element.

The transceiver 1910 is used to receive and transmit data under the control of the processor 1900.

As shown in FIG. 19, the bus architecture may include any number of interconnected buses and bridges, specifically various circuits of one or more processors represented by processor 1900 and memory represented by memory 1920 are linked together. The bus architecture may also link together various other circuits, such as peripherals, voltage regulators, and power management circuits, which are well known in the art and, therefore, will not be described further herein. The bus interface provides the interface. Transceiver 1910 may be a number of elements, including a transmitter and a transceiver, units for communicating with various other devices over a transmission medium. The processor 1900 is responsible for managing the bus architecture and general processing, and the memory 1920 may store data used by the processor 1900 in performing operations.

The processor 1900 is responsible for managing the bus architecture and general processing, and the memory 1920 may store data used by the processor 1900 in performing operations.

The processor 1900 is also used to read the program, and perform the following steps:
  obtaining the authentication result of the terminal from the third network element or the fourth network element, and verifying the edge computing capability of the terminal according to the authentication result and the pre-stored edge computing service capability information of the terminal, obtaining the first authentication information, and generating the edge computing authorization information of the terminal; or
  obtaining the first authentication information of the terminal from the third network element or the fourth network element, and generating edge computing authorization information of the terminal; or obtaining the first authentication information preconfigured in the UDM.

The processor 1900 is also used to read the program, and perform the following steps:

performing mutual authentication with the first network element.

The processor 1900 is also used to read the program, and perform the following steps:

pre-configuring subscription information of the terminal.

The device provided by the embodiment of the present disclosure can execute the above method embodiments, and the implementation principles and technical effects thereof are similar, and details are not described herein again in this embodiment.

Figure 20:
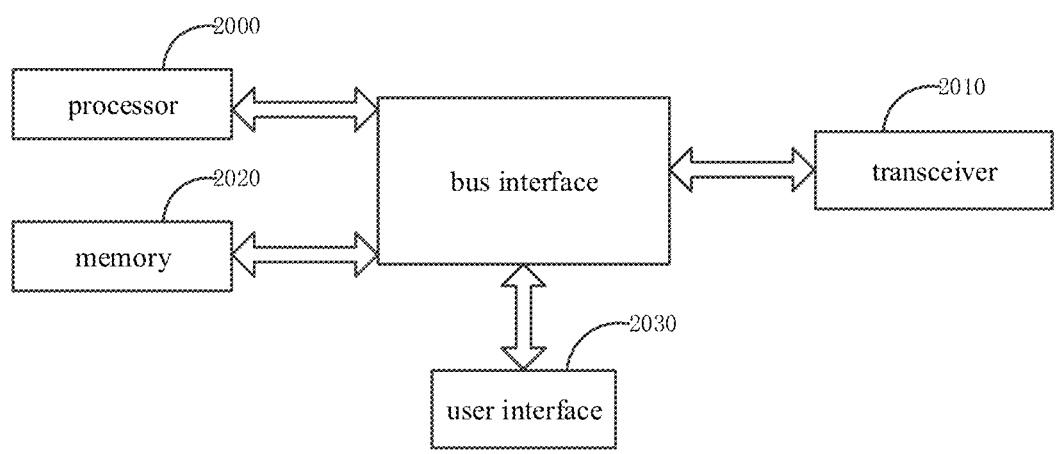
FIG. 20 is a fifth structural diagram of an information processing device provided by an embodiment of the present disclosure.

The embodiments of the present disclosure also provide an information processing device, which is applied to a terminal. As shown in FIG. 20, the terminal according to the embodiment of the present disclosure includes: a processor 2000, configured to read a program in a memory 2020, and perform the following processes:

obtaining information of a second network element from a first network element;

obtaining information of a target network element from the second network element according to the information of the second network element;

wherein, the information of the second network element is sent by the first network element when the authentication of the terminal is successful; the information of the target network element is sent to the terminal when the edge calculation authorization information of the terminal is verified by the second network element.

The transceiver 2010 is used for receiving and transmitting data under the control of the processor 2000.

A shown in FIG. 20, the bus architecture may include any number of interconnected buses and bridges, specifically, various circuits of one or more processors represented by processor 2000 and memory represented by memory 2020 are linked together. The bus architecture may also link together various other circuits, such as peripherals, voltage regulators, and power management circuits, which are well known in the art and, therefore, will not be described further herein. The bus interface provides the interface. Transceiver 2010 may be a number of elements, including a transmitter and a receiver, units for communicating with various other devices over a transmission medium. For different user equipment, the user interface 2030 may also be an interface capable of externally connecting the required equipment, and the connected equipment includes but is not limited to a keypad, a display, a speaker, a microphone, a joystick, and the like.

The processor 2000 is responsible for managing the bus architecture and general processing, and the memory 2020 may store data used by the processor 2000 when performing operations.

The processor 2000 is also used to read the program, and performs the following steps:

sending a first request to the first network element, wherein the first request is used to indicate to request an edge computing service; or sending a fourth request to a third network element request, and the fourth request is used to indicate to request an edge computing service.

The processor 2000 is also used to read the program, and performs the following steps:

sending a second request to the first network element, so that the first network element authenticates the terminal according to the second request;

receiving information of the second network element sent by the first network element, wherein the information of the second network element is sent when the terminal passes the authentication by the first network element.

The device provided by the embodiment of the present disclosure can execute the above method embodiments, and the implementation principles and technical effects thereof are similar, and details are not described herein again in this embodiment.

Embodiments of the present disclosure also provide a computer-readable storage medium, where a computer program is stored on the computer-readable storage medium. When the computer program is executed by a processor, each process of the above information processing method can be implemented, and the same effect can be achieved. In order to avoid repetition, it is not repeated here. The computer-readable storage medium is, for example, a read-only memory (ROM), a random access memory (RAM), a magnetic disk, or an optical disk.

It should be noted that, the terms "comprising", "including" or any other variation thereof are intended to encompass non-exclusive inclusion, such that a process, method, object or device comprising a series of elements includes not only those elements, but also includes other elements not expressly listed or inherent to such a process, method, object or device. Without further limitation, an element defined by the phrase "comprising a . . . " does not preclude the presence of additional identical elements in a process, method, object or device that includes the element.

From the description of the above embodiments, those skilled in the art can clearly understand that the methods of the above embodiments can be implemented by means of software plus a necessary general hardware platform, and of course hardware can also be used, but in many cases the former is better implementation. According to this understanding, the technical solutions of the present disclosure can be embodied in the form of software products in essence, or the parts that make contributions to related technologies. The computer software products are stored in a storage medium (such as ROM/RAM, magnetic disk, optical disk), including several instructions to make a terminal (which may be a mobile phone, a computer, a server, an air conditioner, or a network device, etc.) execute the methods described in the various embodiments of the present disclosure.

The embodiments of the present disclosure have been described above in conjunction with the accompanying drawings, but the present disclosure is not limited to the above-mentioned embodiments, which are merely illustrative rather than restrictive. Under the inspiration of the present disclosure, many forms can be made without departing from the scope of the present disclosure and the protection scope of the claims without departing from the scope of the present disclosure and the protection scope of the claims, which shall fall within the protection of the present disclosure.

What is claimed is:

1. An information processing method, applied to a first network element, comprising:

obtaining first authentication information for a terminal; and in the case of determining that authentication of the terminal is successful according to the first authentication information, sending information of a second network element to the terminal, so that the terminal obtains information of a target network element from the second network element, the information of the target network element is sent by the second network element to the terminal when edge computing authorization information of the terminal is verified by the second network element, and the target network element is used to provide an edge computing service for the terminal;

wherein the edge computing authorization information comprises a token of the terminal, the token indicates that the terminal has the ability to use the edge computing service.

2. The method according to claim 1, wherein the obtaining first authentication information for the terminal comprises:
obtaining the first authentication information from a unified data management entity (UDM);
wherein, the first authentication information is obtained after the terminal is authenticated by a third network element located in a 3GPP network and stored in the UDM; or, the first authentication information is obtained after the UDM receives an authentication result of the terminal generated by the third network element located in the 3GPP network and performs verification on edge computing service capability of the terminal according to the authentication result; or, the first authentication information is obtained after the terminal is authenticated by a fourth network element and stored in the UDM, or, the first authentication information is obtained after the UDM receives an authentication result of the terminal generated by the fourth network element and performs verification on the edge computing service capability of the terminal according to the authentication result; or the first authentication information is obtained after the terminal is authenticated by an authentication network element in a DN and stored in the UDM or, the first authentication information is obtained after the UDM receives an authentication result of the terminal generated by the authentication network element in the DN and performs verification on the edge computing service capability of the terminal according to the authentication result.

3. The method according to claim 2, wherein before the obtaining the first authentication information from UDM, the method further comprises:
performing mutual authentication with the UDM.

4. The method according to claim 1, wherein before the obtaining first authentication information for the terminal, the method further comprises:
receiving a first request sent by the terminal, wherein the first request is used for requesting the edge computing service.

5. The method according to claim 1, wherein the obtaining first authentication information for the terminal comprises:
receiving a second request from the terminal;
authenticating the terminal according to the second request, and obtaining the first authentication information.

6. The method according to claim 5, wherein after sending information of a second network element to the terminal, the method further comprises:
receiving a third request from the second network element, wherein the third request is used to verify the edge computing authorization information of the terminal;
obtaining the token according to the third request; and
sending the token to the second network element.

7. An information processing device, applied to a first network element, comprising: a transceiver, a memory, a processor, and a program stored in the memory and executed by the processor; wherein the processor is configured to read the program in the memory to perform the information processing method according to claim 1.

8. The device according to claim 7, wherein the processor is further configured to read a program in the memory to perform the following processes:
obtaining the first authentication information from a unified data management entity (UDM);
wherein, the first authentication information is obtained after the terminal is authenticated by a third network element located in a 3GPP network and stored in the UDM; or, the first authentication information is obtained after the UDM receives an authentication result of the terminal generated by the third network element located in the 3GPP network and performs verification on edge computing service capability of the terminal according to the authentication result; or, the first authentication information is obtained after the terminal is authenticated by a fourth network element and stored in the UDM, or, the first authentication information is obtained after the UDM receives an authentication result of the terminal generated by the fourth network element and performs verification on the edge computing service capability of the terminal according to the authentication result; or the first authentication information is obtained after the terminal is authenticated by an authentication network element in a DN and stored in the UDM or, the first authentication information is obtained after the UDM receives an authentication result of the terminal generated by the authentication network element in the DN and performs verification on the edge computing service capability of the terminal according to the authentication result.

9. The device according to claim 7, wherein the processor is further configured to read the program in the memory, performing the following processes:
receiving a first request sent by the terminal, wherein the first request is used for requesting the edge computing service.

10. The device according to claim 7, wherein the processor is further configured to read the program in the memory to perform the following processes:
receiving a second request from the terminal;
authenticating the terminal according to the second request, and obtaining the first authentication information.

11. An information processing method, applied to a third network element, wherein the third network element is provided in a 3GPP network, the method comprises:
receiving a fourth request from a terminal, wherein the fourth request is used to indicate to request an edge computing service;
obtaining first authentication information according to the fourth request;
obtaining information of a first network element, and sending the information of the first network element to the terminal, so that the terminal interacts with the first network element, and the first network element performs authentication of the terminal according to the first authentication information, and sends information of a second network element to the terminal, so that the terminal obtains information of a target network element from the second network element, the information of the target network element is sent by the second network element to the terminal when edge computing authorization information of the terminal is verified by the second network element, and the target network element is used to provide an edge computing service for the terminal;

wherein the edge computing authorization information comprises a token of the terminal, the token indicates that the terminal has the ability to use the edge computing service.

12. The method according to claim 11, wherein the obtaining first authentication information according to the fourth request comprises:

authenticating the terminal according to the fourth request to obtain the first authentication information.

13. The method according to claim 12, wherein after the authenticating the terminal according to the fourth request to obtain the first authentication information, the method further comprises:

sending the first authentication information to a UDM, so that the UDM generates the edge computing authorization information of the terminal.

14. The method according to claim 11, wherein the obtaining first authentication information according to the fourth request comprises:

authenticating the terminal according to the fourth request, and obtaining an authentication result;

sending the authentication result to the UDM, so that the UDM verifies edge computing capability of the terminal according to the authentication result and pre-stored edge computing service capability information of the terminal, obtains the first authentication information, and generates the edge computing authorization information of the terminal.

15. The method according to claim 11, wherein the obtaining the information of the first network element comprises:

obtaining the information of the first network element from the UDM.

16. An information processing device, applied to a third network element, wherein the third network element is provided in a 3GPP network, comprising: a transceiver, a memory, a processor, and a program stored in the memory and executed by the processor; wherein the processor is configured to read the program in memory to perform the information processing method according to claim 11.

17. An information processing method, applied to a terminal, comprising:

obtaining information of a second network element from a first network element;

obtaining information of a target network element from the second network element according to the information of the second network element;

wherein, the information of the second network element is sent by the first network element when authentication of the terminal is successful; the information of the target network element is sent to the terminal when edge calculation authorization information of the terminal is verified by the second network element, and the target network element is used to provide an edge computing service for the terminal;

wherein the edge computing authorization information comprises a token of the terminal, the token indicates that the terminal has the ability to use the edge computing service.

18. The method according to claim 17, wherein before the obtaining information of a second network element from a first network element, the method further comprises:

sending a first request to the first network element, wherein the first request is used to indicate to request the edge computing service; or sending a fourth request to a third network element request, and the fourth request is used to indicate to request the edge computing service.

19. The method according to claim 17, wherein the obtaining information of a second network element from the first network element comprises:

sending a second request to the first network element, so that the first network element authenticates the terminal according to the second request;

receiving the information of the second network element sent by the first network element, wherein the information of the second network element is sent when the terminal passes the authentication by the first network element.

20. An information processing device, applied to a terminal, comprising: a transceiver, a memory, a processor, and a program stored in the memory and executed by the processor; wherein the processor is configured to read the program in memory to perform the information processing method according to claim 17.

* * * * *